J. F. ROBERTSON.
VEHICLE WHEEL.
APPLICATION FILED JUNE 16, 1915.
1,180,318.
Patented Apr. 25, 1916.
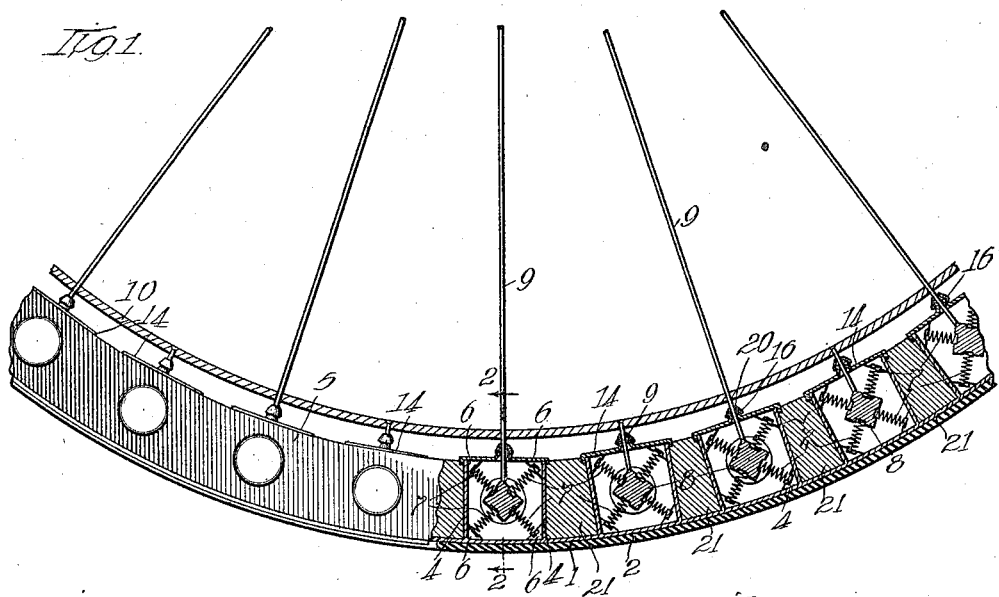
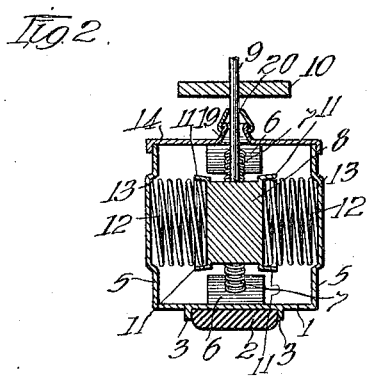
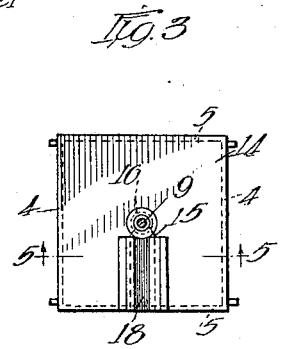
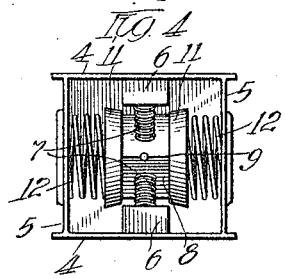
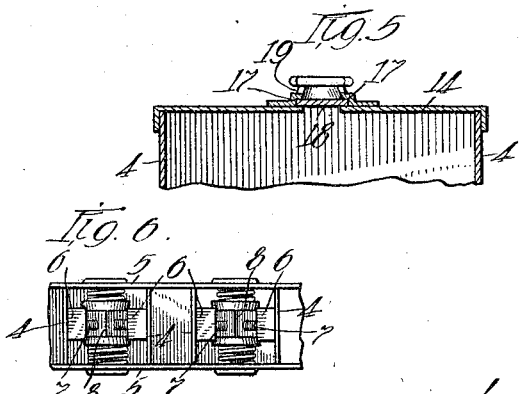
Witnesses:
Robert H. Weer
Arthur W. Carson
Inventor
John F. Robertson
By William L. English Atty.
THE COLUMBIA PLANOGRAPH CO., WASHINGTON, D. C.

UNITED STATES PATENT OFFICE.

JOHN F. ROBERTSON, OF CHICAGO, ILLINOIS.

VEHICLE-WHEEL.

1,180,318.  Specification of Letters Patent.  Patented Apr. 25, 1916.

Application filed June 16, 1915. Serial No. 34,352.

*To all whom it may concern:*

Be it known that I, JOHN F. ROBERTSON, a citizen of the United States, residing at Chicago, in the county of Cook and State of Illinois, have invented certain new and useful Improvements in Vehicle-Wheels, of which the following is a full, clear, concise, and exact description, reference being had to the accompanying drawing, forming a part of this specification.

My invention relates to improvements in vehicle wheels, particularly automobile wheels.

Among the objects of my invention is to provide an improved wheel which shall be simple in construction and efficient in use, and which will have the advantages, without the disadvantages, of the pneumatic tire.

In the accompanying drawing, in which my invention is illustrated—Figure 1 is a side elevation of a portion of a wheel constructed in accordance with my invention, the outer portion of the wheel being shown partly in section; Fig. 2 is a section on the line 2—2 of Fig. 1; Fig. 3 is a view showing the construction of the cover of each of the boxes; Fig. 4 is a view showing in detail the mechanism within each of the boxes forming the yielding connection between the spoke and the annular member of the wheel; Fig. 5 is a section taken on the line 5—5 of Fig. 3; and Fig. 6 is a detailed view of a portion of the annular member of the wheel showing the interior of two of the boxes.

Referring now to the drawing in detail, I have shown my invention in connection with a vehicle wheel comprising an annular rim 1 made of metal or other suitable material, provided with a rubber tread 2 which may be attached in any desirable way, a convenient method being to provide the projections or flanges 3 on the outer surface of the annular rim 1, between which the rubber tread 2 is fitted, as shown in Fig. 2.

At regular intervals around the interior surface of the rim 1 a series of boxes or compartments is constructed, the bottoms of the boxes being formed by the rim 1, and the sides 4 and 5 of the boxes, being constructed of metal or other suitable material, made as a part of or firmly attached to the inner surface of said annular rim, the sides 4 being placed transversely across the rim 1. Each of said boxes is provided with four triangular pieces 6 placed at the inner and outer edges of each of the sides 4 at the middle of said edges, each of said pieces 6 being provided with a circular recess in which fits one end of one of the spiral springs 7. The other end of each of said spiral springs 7 fits in a circular recess formed in one of the faces of a cube or bearing block 8, at the center of one edge of which is firmly attached the spoke or rod 9 which extends upward toward the hub of the wheel and is firmly attached to another annular rim or band 10.

The springs 7 are intended to provide for the resiliency of the wheel upward and downward, but for the resiliency sidewise stronger springs are required and therefore on the two remaining faces of the cube 8 larger circular recesses are formed, which may be conveniently done by attaching to said faces, or having made thereon, the circular cup-shaped pieces 11, in each of which pieces 11 fits one end of one of the larger spiral springs 12, for the reception of the other end of which spring 12 a recess 13 is formed in each of the sides 5 of one of the pieces.

Each of the boxes is provided with a cover 14, which fits tightly over the box, so as to prevent the entry of water therein, and may be fastened by screws or other suitable means. In order that the cover of each of the boxes may be easily removable, I provide a slot 15 in it extending from the opening 16 in the cover of the box through which the spoke 9 extends to the side of the box. When the screws or fastening means for the cover are removed and the cover is lifted up, it can be taken off, the spoke going through the slot. To further guard against the entry of water into the box, I provide recesses 17 on either side of said slot 15 and a leaf or slide 18 to fit in said recesses 17 and cover said slot 15 when the cover is on the box. To further make said box water-tight the edge of the opening 16 through which the spoke extends is bent upward forming a shoulder or nipple 19 over which and over the spoke 9 is fitted a piece of rubber 20. The opening 16 in the cover of the box through which the spoke 9 extends must, of course, be sufficiently large to permit the spoke to work easily upward and downward and sidewise. The inner rim or band 10 must also be placed sufficiently far from the cover 14 of each of the boxes to permit the spoke 9 to move upward and downward. The same spoke 9 may extend to the hub of the wheel, or said spoke 9 may only extend to the inner rim or band 10, and from the rim or band 10 other spokes may extend to the hub of the wheel. As shown in the drawing, I have indicated some of the spokes extending to the hub of the wheel and some only to the inner rim or band 10.

The sides 5 of the boxes may obviously be formed by one continuous piece extending around the wheel, just as the bottom of each of the boxes is formed by the annular rim 1, or the sides 5 of the boxes may be made separately and the spaces between the boxes may be filled with solid pieces of wood 21, attached to the rim 1 and the sides 4 of the boxes.

Having thus described my invention what I claim as new and desire to secure by Letters Patent is:—

1. A vehicle wheel comprising a substantially rigid annular member, a plurality of rods, adapted to be connected to a portion of the wheel lying within the annular member, yielding connections between said member and rods comprising a plurality of chambers rigidly attached to said member, bearing blocks within said chambers and connected to said rods, and spring means extending between opposite sides of the chambers and the sides of the bearing blocks.

2. A vehicle wheel comprising a substantially rigid annular member, a plurality of rods, adapted to be connected to a portion of the wheel lying within the annular member, yielding connections between said member and rods comprising a plurality of chambers rigidly attached to said member, bearing blocks within said chambers and connected to said rods, said chambers being substantially rectangular in cross section, and spring means extending between opposite sides of the rectangular chambers and the sides of the bearing blocks.

3. A vehicle wheel comprising a substantially rigid annular member, a plurality of rods, adapted to be connected to a portion of the wheel lying within the annular member, yielding connections between said member and rods comprising a plurality of chambers rigidly attached to said member, bearing blocks within said chambers and connected to said rods, and coil springs extending between opposite sides of the chambers and the sides of the bearing blocks.

4. A vehicle wheel comprising a substantially rigid annular member, a plurality of rods, adapted to be connected to a portion of the wheel lying within the annular member, yielding connections between said member and rods comprising a plurality of chambers rigidly attached to said member, bearing blocks within said chambers and connected to said rods, said chambers being substantially rectangular in cross section, said blocks being substantially rectangular, and spring means extending between each face of said bearing blocks and the sides of said chambers.

5. A vehicle wheel comprising a substantially rigid annular member, a plurality of rods, adapted to be connected to a portion of the wheel lying within the annular member, yielding connections between said member and rods comprising a plurality of chambers rigidly attached to said member, bearing blocks within said chambers and connected to said rods, said blocks being substantially rectangular, and spring means extending between each face of said bearing blocks and the sides of said chambers.

6. A vehicle wheel comprising a substantially rigid annular member, a plurality of rods, adapted to be connected to a portion of the wheel lying within the annular member, yielding connections between said member and rods comprising a plurality of chambers rigidly attached to said member, bearing blocks within said chambers and connected to said rods, said chambers being substantially rectangular in cross section, said blocks being substantially rectangular, and coil springs extending between each face of said bearing blocks and the sides of said chambers.

7. A vehicle wheel comprising an annular member and a rod, adapted to be connected to a portion of the wheel lying within the annular member, yielding means connecting said annular member and rod, a chamber in which said yielding means is located, said chamber having an opening in one of its walls through which said rod passes, said wall being removable from the rest of said chamber to constitute a removable cover, and having a slot leading from said opening to the edge of said cover whereby said cover may be removed from said rod.

8. A vehicle wheel comprising an annular member and a rod, adapted to be connected to a portion of the wheel lying within the annular member, yielding means connecting said annular member and rod, a chamber in which said yielding means is located, said chamber having an opening in one of its walls through which said rod passes, said wall being removable from the rest of said chamber to constitute a removable cover and having a slot leading from said opening to the edge of said cover whereby said cover may be removed from said rod, said cover being provided with a closure for said slot.

9. A vehicle wheel comprising an annular member and a rod, adapted to be connected to a portion of the wheel lying within the annular member, yielding means connecting said annular member and rod, a chamber in which said yielding means is located, said chamber having an opening in one of its walls through which said rod passes, said wall being removable from the rest of said chamber to constitute a removable cover and having a slot leading from said opening to the edge of said cover whereby said cover may be removed from said rod, said cover being provided with a closure for said slot, said closure being provided with guide-ways adjacent the edges of said slot, and a closure for said slot slidable in said guide-ways.

In witness whereof, I have hereunto subscribed my name in the presence of two witnesses.

JOHN F. ROBERTSON.

Witnesses:
JAMES P. HARROLD,
ALICE B. LANSING.